United States Patent [19]
Arvilla

[11] Patent Number: 5,655,473
[45] Date of Patent: Aug. 12, 1997

[54] BOAT HULL

[75] Inventor: Joel W. Arvilla, Marco Island, Fla.

[73] Assignee: Lynn Davis Nebel, Marco Island, Fla.; a part interest

[21] Appl. No.: 709,386

[22] Filed: Sep. 6, 1996

[51] Int. Cl.⁶ .................................................. B63B 1/12
[52] U.S. Cl. .............................................. 114/61; 114/288
[58] Field of Search .................... 114/271, 288–290, 114/61; D12/310, 312

[56] References Cited

U.S. PATENT DOCUMENTS

| | | | |
|---|---|---|---|
| 2,900,945 | 8/1959 | Canazzi | 114/66.5 |
| 3,148,652 | 9/1964 | Canazzi | 114/290 |
| 3,937,164 | 2/1976 | Austin | 114/66.5 |
| 4,004,534 | 1/1977 | Allison | 114/274 |
| 4,192,248 | 3/1980 | Moyer | 114/56 |
| 4,301,758 | 11/1981 | Riviere | 114/61 |
| 4,708,077 | 11/1987 | Balquet et al. | 114/61 |
| 4,924,797 | 5/1990 | Solia | 114/288 |
| 4,951,591 | 8/1990 | Coles | 114/274 |
| 5,188,049 | 2/1993 | Graf | 114/61 |
| 5,211,126 | 5/1993 | Johnson | 114/288 |
| 5,419,274 | 5/1995 | vD | 114/271 |

FOREIGN PATENT DOCUMENTS 2604412  4/1988  France .................................. 114/289

*Primary Examiner*—Edwin L. Swinehart
*Attorney, Agent, or Firm*—Gifford, Krass, Groh, Sprinkle, Patmore, Anderson & Citkowski, P.C.

[57] ABSTRACT

A boat hull is disclosed having a bow and a stern. The hull includes a pair of elongated sponsons, each having a lower surface adapted to contact a water body having a water level. The sponsons are spaced apart and generally parallel to each other and form a channel therebetween. An aerodynamic member is positioned within this channel. The aerodynamic member includes an air compression section which slopes downwardly from the bow to a midpoint of the hull. Similarly, an air decompression section slopes upwardly from the midpoint of the hull and towards the stern. In operation, the aerodynamic member is dimensioned such that, upon forward movement of the hull through the water body, the compression of air flow through the channel by the air compression section and subsequent decompression of the air by the decompression section is sufficient to elevate water in the rear portion of the channel above the water level of the water body.

13 Claims, 3 Drawing Sheets

BOAT HULL

BACKGROUND OF THE INVENTION

I. Field of the Invention

The present invention relates generally to boat hulls and, more particularly, to a dual sponson boat hull.

II. Description of the Prior Art

There are, of course, many previously known boat hulls. Many of these boat hulls, furthermore, include two sponsons which are spaced apart and generally parallel to each other. A motor is secured to the stern or transom in order to power the boat. One disadvantage of these previously known dual sponson power boats, however, is that, as the speed of the boat increases, the boat tilts upwardly at its front from the horizontal so that only the tail ends of the sponsons are in the water. This decreases the overall speed efficiency of the hull.

A still further disadvantage of these previously known dual sponson power boats is that the propeller blade from the motor must necessarily extend downwardly below the bottom of the sponsons in order to insure that the propeller remains in water during operation of the motor. Otherwise, cavitation results. This, however, is acceptable when it is desired to use the boat in shallow water. In these cases, the propeller may unacceptably contact the bottom or articles on the bottom of the water body.

SUMMARY OF THE PRESENT INVENTION

The present invention provides a boat hull for a power boat which overcomes all of the above-mentioned disadvantages of the previously known power boat hulls.

In brief, the boat hull of the present invention comprises a pair of elongated sponsons each having a lower surface adapted to contact a body of water having a water level. The sponsons are spaced apart and generally parallel to each other and form a channel therebetween.

An elongated aerodynamic member is positioned in the channel and interconnects the sponsons with each other. This aerodynamic member has an air compression section which slopes downwardly to a front portion of the channel from the bow of the boat and to a midportion of the boat so that the cross-sectional area of the channel decreases rearwardly from the bow into the midpoint of the hull.

The aerodynamic member further includes an air decompression section which slopes upwardly from the midpoint and toward the stern of the boat such that the cross-sectional area of the rear portion of the channel increases rearwardly from the midpoint into the hull stern.

The aerodynamic member, furthermore, is dimensioned such that, upon forward movement of the hull through the water body greater than a predetermined speed, the compression of air flow through the channel by the air compression section and subsequent decompression by the air decompression section is sufficient to elevate the water in the rear portion of the channel above the water level of the water body. In doing so, the propeller from the engine may be positioned above the lower surface of the sponsons so that the boat hull can be efficiently operated in extremely shallow waters.

BRIEF DESCRIPTION OF THE DRAWING

A better understanding of the present invention will be had upon reference the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 2:
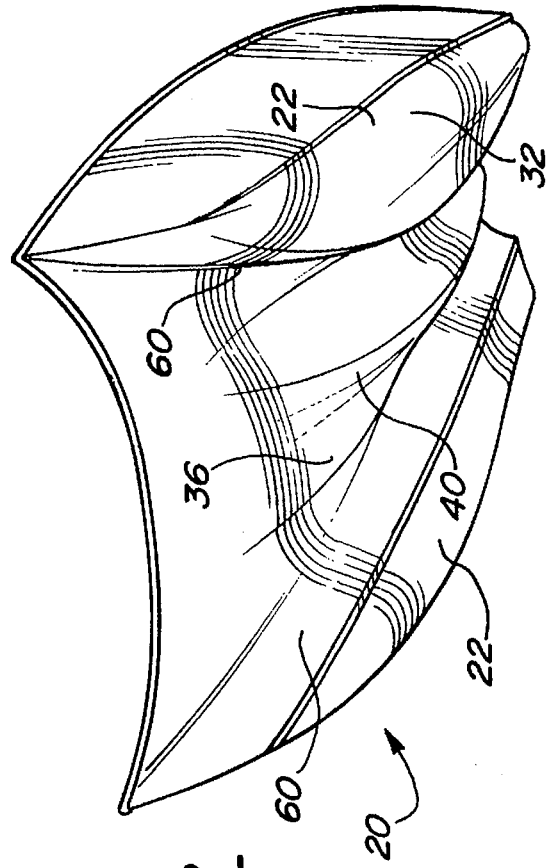
FIG. 2 is a bottom elevational view illustrating a preferred embodiment of the present invention.
Figure 1:
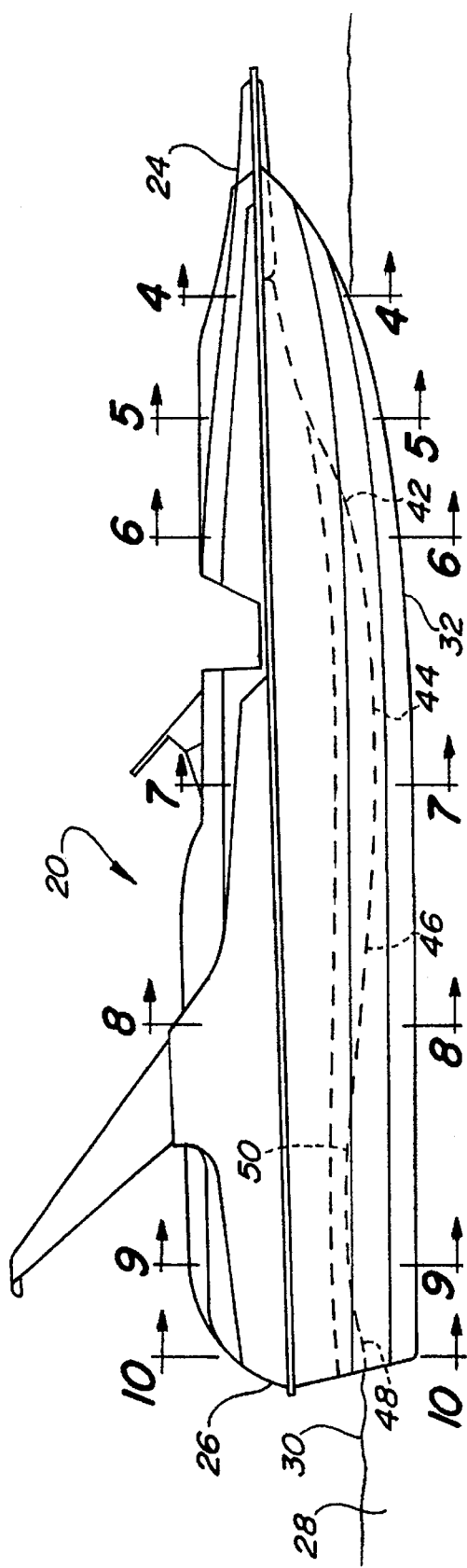
FIG. 1 is a side view illustrating a preferred embodiment of the present invention.

With reference first to FIGS. 1 and 2, a preferred embodiment of the boat hull 20 of the present invention is there shown and comprises a pair of elongated sponsons 22 which are spaced apart and generally parallel to each other. The sponsons 22, furthermore, extend between the bow 24 and the stern 26 of the boat hull 20.

The boat hull 20 is adapted for use with a water body 28 (FIG. 1) having a water level 30. With the boat hull 20 positioned on the water body 28, the lower surface 32 of the sponsons 22 support the boat hull 20 and simultaneously form a longitudinally extending channel 36 between the sponsons 22 and the water body 28.

Still referring to FIGS. 1 and 2, an aerodynamic member 40, which is V-shaped in cross-section, extends downwardly into the channel 36 and interconnects the sponsons 22 to each other. As will be shortly described in greater detail, this aerodynamic member 40 includes an air compression section 42 which slopes downwardly from the hull bow 24 to a midpoint 44 of the boat hull. The aerodynamic member 42 further includes an air decompression section 46 which extends from the midpoint 44 towards the stern 26 and, finally, a tail section 48 which slopes downwardly from a point 50 (FIG. 1) closely adjacent to the stern 26 to the stern 26.

Under normal hull loading, the aerodynamic member is completely positioned above the water level. Furthermore, the lowest most or midpoint 44 of the aerodynamic member is positioned between one-third and one-half of the hull length from the bow.

Figure 7:
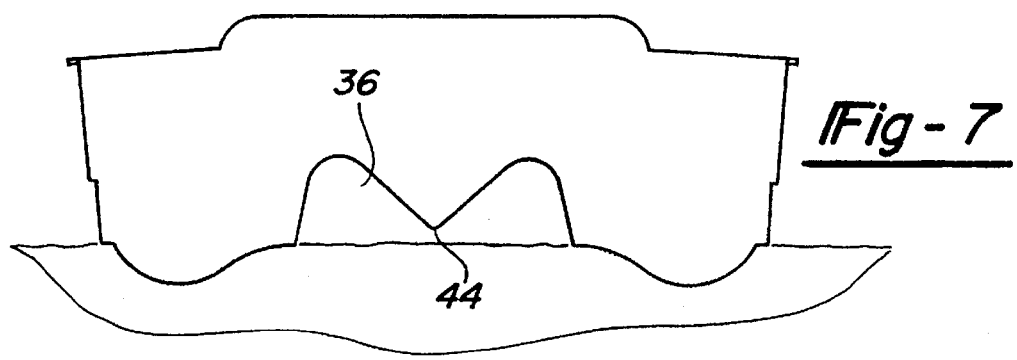
FIG. 7 is a cross-sectional view taken substantially along line 7—7 in FIG. 1.

With reference now to FIGS. 4–7, the cross-section of the boat hull 20 is there shown from the point at which the lower surface 32 of the sponsons 22 contact the water body 28 (FIG. 4) to the midpoint 44 (FIG. 7). As can thus be seen, the air compression section 42 of the aerodynamic member 40 slopes downwardly from the bow 24 into the channel 36 reaching its lowermost point in the channel 36 at the midpoint 44 (FIG. 7). In doing so, the air compression member 40 effectively reduces the cross-sectional area of the channel 36.

Still referring to FIGS. 4–7 and also to FIG. 1, the sponsons 22 include inwardly facing sides 60 which curve towards each other from the bow 24 into the midpoint 44 of the boat hull 20. This curvature of the sponsons 22 in combination with the air compression member 40 further reduces the cross-sectional area of the channel 36 from the boat bow 24 into its midpoint 44. Preferably, the cross-sectional area of the channel 36 at its midpoint 44 (FIG. 7) is no more than one-half of its initial cross-sectional area (FIG. 4), and preferably no more than one-third of the cross-sectional area.

Figure 8:
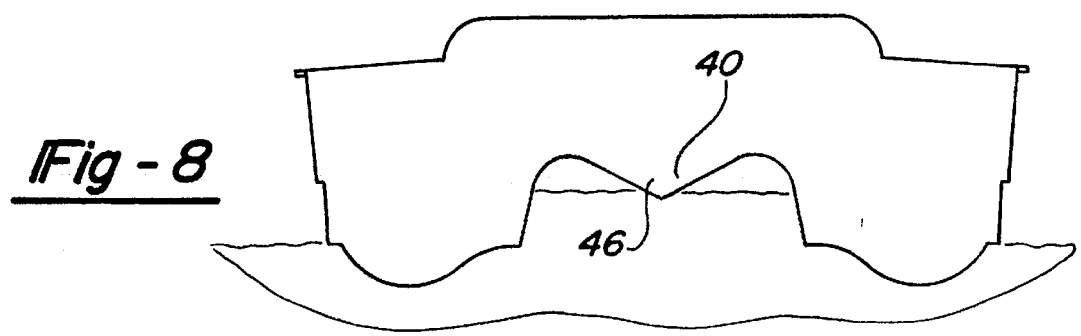
FIG. 8 is a cross-sectional view taken substantially along line 8—8 in FIG. 1.
Figure 9:
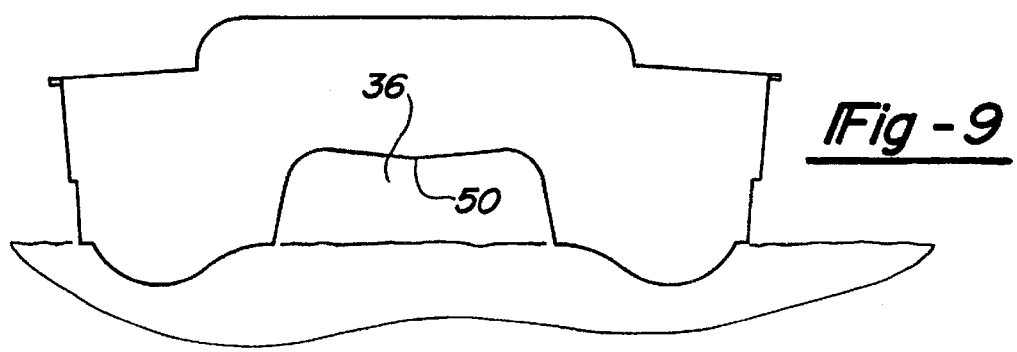
FIG. 9 is a cross-sectional view taken substantially along line 9—9 in FIG. 1.

Referring now to FIGS. 1, 8 and 9, in the air decompression section 46 of the aerodynamic member 40, the aerodynamic member 40 slopes upwardly from the midpoint 44 and towards the boat stern 26. In doing so, the area of the channel 36 is effectively increased from its minimal amount at the midpoint 44. The purpose for this upward sloping of the air decompression section 46 will be subsequently described.

Figure 10:
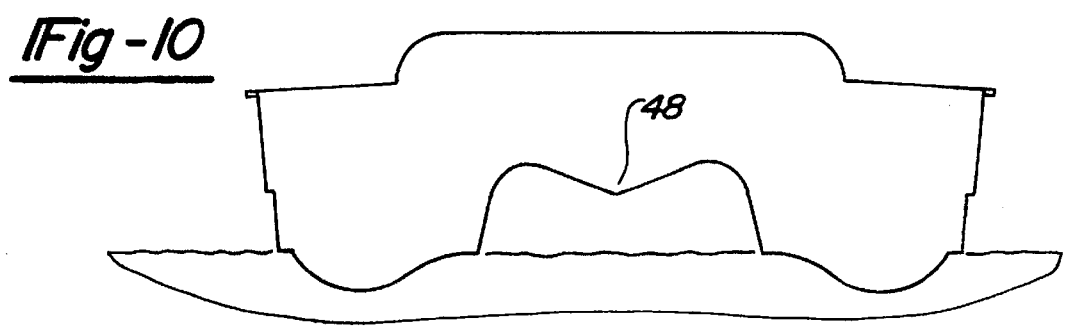
FIG. 10 is a cross-sectional view taken substantially along line 10—10 in FIG. 1.

Finally, with reference to FIGS. 1 and 10, in the tail section 48 of the aerodynamic member 40, the aerodynamic member slopes downwardly from the point 50 (FIG. 1 and FIG. 9) and to the stern 26. The tail section 48 thus slightly reduces the cross-sectional area of the channel 36 for a reason to be subsequently described. It should be understood, however, that the downwardly sloping tail section 48 is optional and not required to practice the invention.

Figure 3:
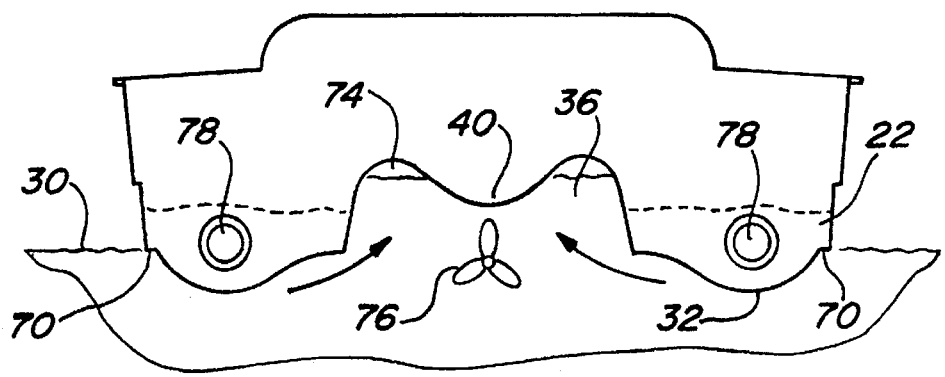
FIG. 3 is a rear view of the preferred embodiment of the present invention.
Figure 4:
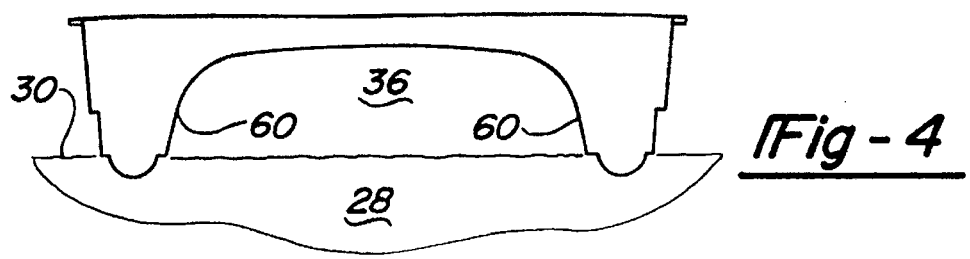
FIG. 4 is a sectional view taken substantially along line 4—4 in FIG. 1.
Figure 5:
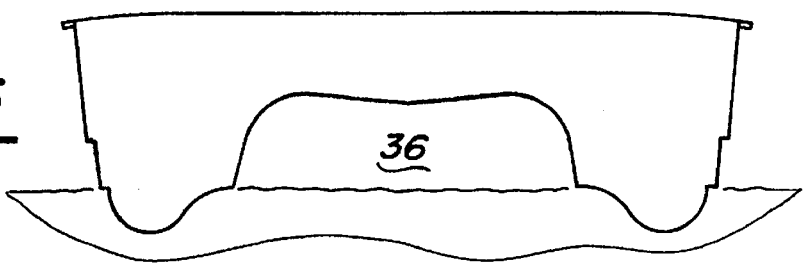
FIG. 5 is a cross-sectional view taken substantially along line 5—5 in FIG. 1.
Figure 6:
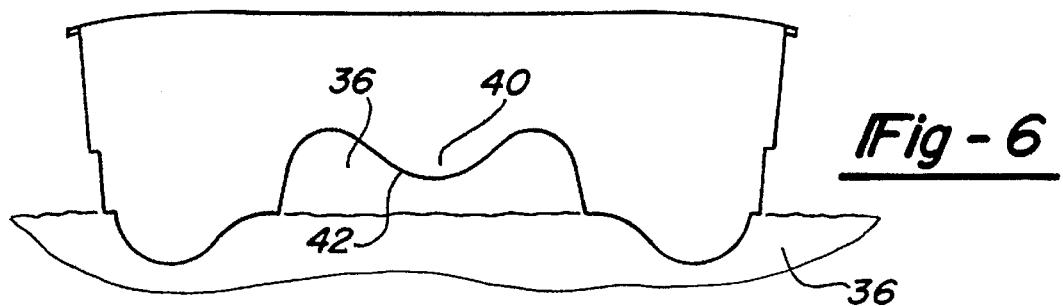
FIG. 6 is a cross-sectional view taken substantially along line 6—6 in FIG. 1.

With reference now to FIG. 3, the lower surfaces 32 of the sponsons 22 are generally semi-cylindrical in shape and have an outer chine 70 extending along their longitudinal length. Since the lower surface 32 of the sponsons 22 are generally semi-cylindrical in shape, as the boat hull 20 moves through the water, the sponsons 22 will direct at least a portion, preferably generally one-half, of the water displaced by the sponsons 22 into the channel 32 as indicated by arrows 72.

In the preferred embodiment of the invention, the sponsons 22 and aerodynamic member 40 are of a one-piece construction and, preferably, of a one-piece fiberglass construction. Other materials, as well as a multi-piece construction, may alternately be employed without deviation from the spirit or scope of the invention.

In operation, as the boat hull travels through water greater than a predetermined speed, the inwardly curving sides 60 of the sponsons 22 together with the air compression section 42 of the aerodynamic member 40 effectively compresses air in the channel 36 such that the air reaches a maximum compression at the midpoint 44, i.e. the lowest most portion of the aerodynamic member 40, which is also the point of the smallest cross-section area of the channel 32.

After the compressed air passes the midpoint 44, the compressed air enters the decompression section 46 of the aerodynamic member 40. As best shown in FIG. 3, this decompression in effect draws water up into the channel 36 and thus above the water level 30 of the water body 28. Furthermore, since the aerodynamic member 40 is generally V-shaped in cross-section, the air which actually passes through the rear portion of the channel 36 through which the decompression section 46 extends is trapped at the upper portions 74 (FIG. 3) of the channel 36.

Finally, the tail section 48 of the aerodynamic member 40 slightly increases the compression in the channel 32 by decreasing its cross-sectional area immediately before the water and air are expelled out from the rear end of the channel 36. This tail section 48 thus forces any air entrapped within the water into the upper portions 74 of the channel 36 and thus reduces cavitation which might otherwise occur.

Referring again to FIG. 3, since the water level is effectively raised above the water level 30 in the rear portion of the channel 32, it is possible to position a propeller 76 such that the propeller 76 is positioned above the bottom 32 of the sponsons 22 and still be operatively positioned in water. As such, the boat hull of the present invention can be effectively used in extremely shallow water.

A still further advantage of the successive compression and decompression of the air within the channel 36 is that the decompression of the air in the rear portion of the channel 36 effectively maintains the boat within a few degrees of level with the water surface even at high speed operation. This design further insures a minimum hull depth into the water and maximizes hull speed efficiency.

Referring again to FIG. 3, although a propeller 76 may be used to power the boat hull, optionally water jets 78 may be positioned in the sponsons 22. The water jets 78 are well known in the art so that a further description thereof is unnecessary.

Although one particular "cap" or boat top is shown in FIG. 1, it will be understood that the boat hull 20 of the present invention can be used with any type of boat cap. Furthermore, different types of boats can be easily manufactured utilizing the same boat hull but different boat caps.

From the foregoing, it can be seen that the present invention provides a novel and unique boat hull for power boats. Having described my invention, however, many modifications thereto will become apparent to those skilled in the art to which it pertains without deviation from the spirit of the invention as defined by the scope of the appended claims.

I claim:

1. A boat hull having a bow and a stern, said hull comprising:

a pair of elongated sponsons, each sponson having a lower surface adapted to contact a water body having a water level, said sponsons being spaced apart and generally parallel to each other and forming a channel between said sponsons and the water level, said channel being spaced upwardly from the water level, said channel having a front portion extending longitudinally from a midpoint of said hull toward the bow and a rear portion extending longitudinally from said midpoint towards said stern, an aerodynamic member positioned in said channel and interconnecting said sponsons, said aerodynamic member having an air compression section sloping downwardly into said front portion of said channel from said bow to said midpoint such that a cross-sectional area of said channel decreases rearwardly from said bow and to said midpoint of said hull, said aerodynamic member being dimensioned such that, under normal loading, said aerodynamic member is entirely positioned above the water level, said aerodynamic member having an air decompression section sloping upwardly into said rear portion of said channel from said midpoint to a point adjacent the stern such that a cross-sectional area of said rear portion of said channel continually increases rearwardly from said midpoint and to said point adjacent the stern, wherein said aerodynamic member is dimensioned such that, upon forward movement of said hull through the water body greater than a predetermined speed, the compression of air flow through said channel by said air compression section and subsequent decompression by said air decompression section is sufficient to elevate water in the rear portion of said channel above the water level.

2. The invention as defined in claim 1 wherein a portion of said sponsons adjacent the bow taper outwardly from each other.

3. The invention as defined in claim 1 wherein the cross-sectional area of said channel at said midpoint is less than one-half the cross-sectional area of said channel adjacent the bow.

4. The invention as defined in claim 3 wherein the cross-sectional area of said channel at said midpoint is less than one-third the cross-sectional area of said channel adjacent the bow.

5. The invention as defined in claim 1 wherein the cross-sectional area of said channel at said midpoint is less than one-half the cross-sectional area of said channel adjacent the stern.

6. The invention as defined in claim 5 wherein the cross-sectional area of said channel at said midpoint is less than one-third the cross-sectional area of said channel adjacent the stern.

7. The invention as defined in claim 1 wherein said aerodynamic member further comprises a downwardly sloping tail section which extends between said stern and a point closely adjacent said stern.

8. The invention as defined in claim 1 wherein said aerodynamic member is generally V-shaped in cross-section.

9. The invention as defined in claim 1 wherein each sponson includes a generally semi-cylindrical lower water contacting surface.

10. The invention as defined in claim 9 and comprising a longitudinally extending chine on an outer surface of each sponson.

11. The invention as defined in claim 1 wherein said aerodynamic member is dimensioned such that, with normal hull loading, said aerodynamic member is positioned above said water level at said midpoint.

12. The invention as defined in claim 1 wherein said sponsons are shaped such that the width of said first portion of said channel decreases from said bow to said midpoint.

13. The invention as defined in claim 1 and comprising a water jet propulsion means in each sponson.

* * * * *